April 8, 1924.

T. J. SMITH

COTTON PICKER HEAD

Filed June 15, 1922

1,489,552

WITNESSES:

Taylor J. Smith
INVENTOR.

Patented Apr. 8, 1924.

1,489,552

UNITED STATES PATENT OFFICE.

TAYLOR J. SMITH, OF UNION CITY, GEORGIA.

COTTON-PICKER HEAD.

Application filed June 15, 1922. Serial No. 568,668.

*To all whom it may concern:*

Be it known that I, TAYLOR J. SMITH, a citizen of the United States, residing at Union City, in the county of Campbell and State of Georgia, have invented certain useful Improvements in Cotton-Picker Heads, of which the following is a specification.

This invention aims to provide novel means for preventing the slowing up of the rearward movement of the cotton in a cotton picker of that type shown in my prior Patent No. 1,373,983.

Figure 1:
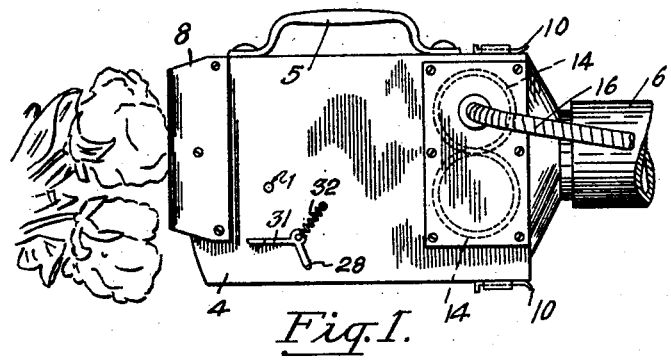
Figure 2:
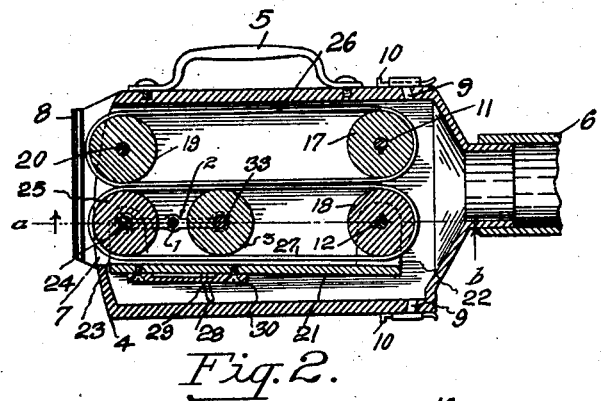
Figure 3:
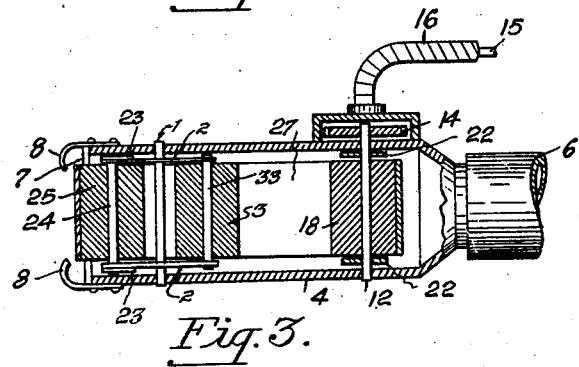

In the drawing, Figure 1 shows, in side elevation, a picker embodying the improvements claimed hereinafter; Figure 2 is a vertical longitudinal section; Figure 3 is a vertical horizontal section on the line a—b of Figure 2.

Referring briefly to parts shown in my prior Patent No. 1,373,983, the device comprises a casing 4 provided with a handle 5, one end of the casing being connected to a suction conduit 6, the other end of the casing being supplied with an opening 7 through which the cotton enters, there being guides 8 on the casing at each side of the opening. Draft slots 9 are formed in the casing 4 and are controlled by dampers 10. An upper driven shaft 11 and a lower driven shaft 12 are journaled in the casing 4 and are connected by gears 14. The upper shaft 11 is operated by a shaft 15 in a casing 16. The shaft 11 carries a pulley 17 and there is a pulley 18 on the shaft 12. A pulley 19 is journaled at 20 on the casing 4. A first lever 21 is provided and has ears 22 whereby the lever is fulcrumed on the shaft 12. There are ears 23 on the lever 21, wherein a shaft 24 is mounted. The shaft 24 carries a pulley 25. A first belt 26 is engaged about the pulleys 17 and 19, a second belt 27 being engaged about the pulleys 25 and 18. A shaft 28 is journaled in the casing 4 and has a crank 29 operating in a guide 30 on the lever 21. The shaft 28 is operated by an external handle 31. A spring 32 is connected to the handle 31 and to the casing 4 and tends to raise the lever 21 and the pulley 25 so that the forward portions of the belts 26 and 27 are in contact as shown in Figure 2. The cotton to be picked is caught between the forward portions of the belts 26 and 27 and is carried rearwardly into the field of the suction conduit 6. Through the instrumentality of the handle 31, the forward end of the lever 21 may be swung downwardly by an operator, thereby spacing the forward portions of the belts 26 and 27 for the reception of the cotton therebetween. All of the foregoing parts are shown and described in my prior patent hereinbefore mentioned.

Passing to the improvements which characterize the present machine, it has been claimed by some that when a large lump of cotton enters between the forward portions of the belts 27 and 26, the rear portions of the belts are spaced apart, the result being that the rearward movement of smaller wads of cotton (which happen to be to the rear of the pulleys 19 and 25) is checked, a clogging or choking of the machine resulting. In order to remedy this alleged shortcoming, a support 1 is mounted in the sides of the casing 4 to the rear of the pulley 25, arms 2 being fulcrumed intermediate their ends on the support 1, the outer ends of the arms being pivoted on the shaft 24, and the inner ends of the arms carrying a shaft 33, supporting a roller 3 for rotation, the roller being located between the upper and lower runs of the belt 27. When the pulley 25 moves downwardly, the arms 2 will tilt, the roller 3 being raised, and the upper run of the belt 27 being flexed, the friction on the cotton between the belts 26 and 27 being increased, and there being no appreciable slowing of the rearward movement of the cotton. The parts 1, 2, 33 and 3 may be alluded to generally as a second lever fulcrumed intermediate its ends on the casing 4, one end of said lever being represented by the roller 3.

I claim:

1. In a cotton picker, a casing, a first belt in the casing, means for supporting the belt for movement, a second belt cooperating with the first belt, means for carrying one end of the second belt, a first lever fulcrumed on the casing and carrying the other end of the second belt, and a second lever fulcrumed intermediate its ends on the casing and located within the second belt, one end of the second lever being pivoted to the first lever, and the other end of the second lever cooperating with that run of the second belt which is adjacent to the first belt, to flex said run when the first lever is tilted.

2. In a cotton picker, a casing, a first belt in the casing, means for supporting the belt for movement, a second belt cooperating with the first belt, means for carrying one end of the second belt, a lever fulcrumed on the casing and carrying the other end of the second belt, an arm mounted intermediate its ends to swing on the casing, a roller journaled on one end of the arm and located between the runs of the second belt, the other end of the arm being pivoted to the lever, whereby when the lever is tilted, the roller will flex that run of the second belt which is adjacent to the first belt.

In testimony whereof I affix my signature hereto.

TAYLOR J. SMITH.